Oct. 2, 1956   P. F. KERR   2,765,411
DETECTION AND MEASUREMENT OF PENETRATIVE RADIATION
Filed Feb. 24, 1953
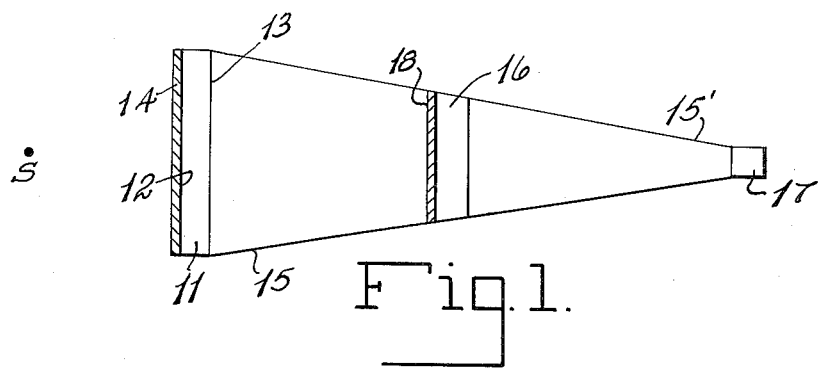
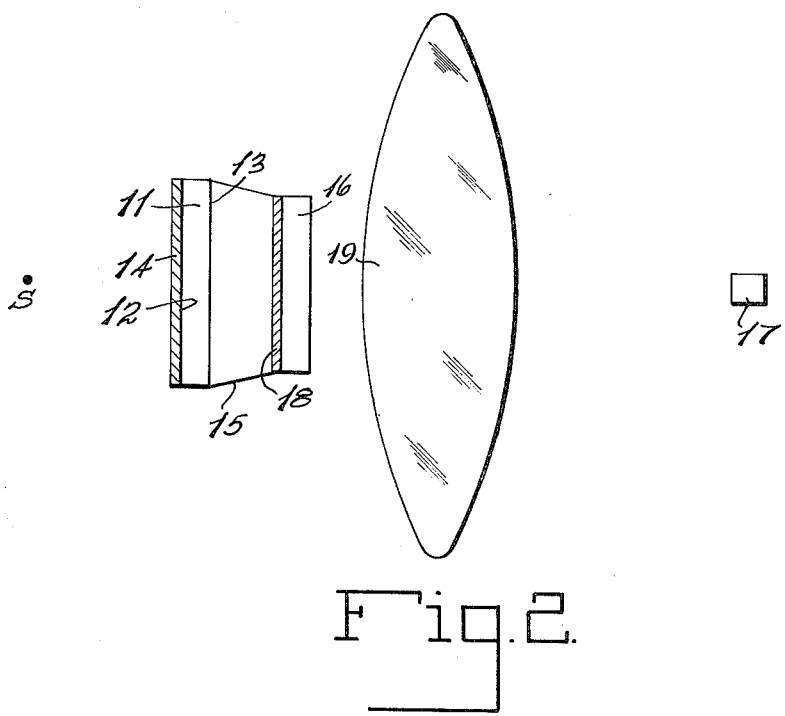
INVENTOR.
PAUL F. KERR
BY
ATTORNEY

United States Patent Office 2,765,411
Patented Oct. 2, 1956

2,765,411

DETECTION AND MEASUREMENT OF PENETRATIVE RADIATION

Paul F. Kerr, New York, N. Y., assignor to Texaco Development Corporation, New York, N. Y., a corporation of Delaware Application February 24, 1953, Serial No. 338,240

7 Claims. (Cl. 250—71)

This invention relates to the detection and measurement of penetrative radiation such as gamma rays.

This is a continuation-in-part of application Serial Number 84,571 which was filed on March 31, 1949, now abandoned.

One object of the invention is the provision of a novel method for the detection and measurement of penetrative radiation such as gamma rays.

A further object of the invention is the provision of a novel method for the detection and measurement of penetrative radiation such as gamma rays wherein such radiation which is exceedingly difficult to detect and measure, especially when encountered in relatively small amounts, is converted to the more easily detectable visible light which is capable of accurate measurement.

Another object of the invention is the provision of novel apparatus for practicing the aforesaid methods.

In the drawing Figs. 1 and 2 are schematic representations of two embodiments of this invention.

In brief, the present invention involves a method wherein highly penetrative radiation such as a flux of gamma rays is intercepted on a first so-called phosphor element which is sufficiently massive and/or dense to absorb a substantial part of the radiation and is capable, in so doing, to convert individual quanta of the absorbed penetrative radiation into respective impulses of energy which for the most part is in the ultraviolet region of the spectrum. This first energy conversion effects a very pronounced change from extremely short wave lengths to relatively very much longer ones. In order for the light impulses to serve the purpose intended herein they must be able to pass out of the first phosphor and from it to another component of the detector and therefore the first phosphor should have good transmission for ultraviolet light, e. g., it should be transparent to it. As a next step the ultraviolet radiation is intercepted on a second phosphor element, which does not have to be particularly massive and/or dense because of the limited range of penetration of ultraviolet light, which is capable of converting the impulses of ultraviolet radiation into corresponding impulses of visible light. It will be apparent from the foregoing that in embodiments which are to be used where space is at a premium the detector will be characterized by the fact that the second phosphor will be substantially less massive than the first one though of course generally speaking this is not essential for operativeness. While the second energy conversion is less pronounced than the first one, since it involves a relatively much smaller increase in wave length, it is a very important one because of its markedly beneficial effect on the overall efficiency of the detector. The impulses of visible light are then intercepted on a high gain photoelectric device, such as a photo-sensitive Geiger-Mueller tube or a photo-multiplier tube, whose photo-sensitive cathode is particularly responsive to light in the spectral range of the emissions of the second phosphor. The photo-electric device converts the impulses of visible light into electrical pulses which thereafter can be utilized to actuate indicating and/or recording devices of a variety of kinds which are well known in the art of detecting radiation and are frequently characterized by the use of such familiar components as scalers, counters, integrators, etc.

Phosphors capable of responding to penetrative radiation with the production of radiation in the ultraviolet range of the spectrum are the inorganic and organic types. Typical of the inorganic type are zinc sulfide, zinc silicate, scheelite, synthetic calcium tungstate and sodium iodide. Typical organic phosphors include naphthalene, anthracene, phenanthrene, diphenyl or mixtures thereof.

Except for the fact that any suitable first phosphor, apart from its ability to transmit ultraviolet light, should not be so large that an excessively large portion of such light will be absorbed within it as it moves internally of the phosphor in direct or multipath transmission paths toward the second phosphor, its dimensions should be maximized to assure an acceptably high absorption of the penetrative radiation to an extent which, of course, will vary with different phosphors and can be determined in each case on the basis of experience heretofore gained in the art of luminophors suitable for scintillometers.

The second phosphor, i. e., the element for converting ultraviolet radiation to visible light may be formed of or include such materials as willemite, fluorescent opal, wernerite or fluorite. Uranium phosphate is excellent for such purpose. While it is radioactive, the extent of its radioactivity can be accurately determined and subtracted from the total so that the final measurement is that of the radiation it is desired to detect. However, preferably both the first and second phosphors should be completely devoid of any traces of contamination with radioactive substances. As with the first phosphor, the physical dimensions of the ultraviolet-converting phosphor must be limited in proportion to its self-absorption for the visible light which it produces. It is also desirable that both of the phosphors have relatively short decay times, e. g., of the order of 10 micro-seconds or less to permit detection of individual quanta of penetrative radiation even if as in the case of fairly intense radiation, the quanta have a relatively high occurrence rate.

Fig. 1 illustrates one embodiment of the invention wherein a first phosphor element 11 shown in disc shape is disposed with one of its sides 12 facing toward a source S of gamma radiation and preferably covered with a relatively thin screen or cap 14 of a material that permits the passage of gamma rays into the phosphor but reflects any ultraviolet radiation attempting to escape from or enter face 12 of the phosphor element. A suitable material for such purpose is aluminum, silver, cadmium or lead foil. The opposite side 13 of the phosphor element 11 is open to permit the escape of the generated ultraviolet radiation therefrom.

The first phosphor 11 is positioned adjacent an input end of a light conducting device 15 shown by way of illustration as a truncated cone, which may be formed in a number of different ways. It may be a hollow tube whose interior surfaces are coated with a material such as aluminum, silver or cadmium capable of reflecting transverse rays of ultraviolet radiation back and forth across the tube so that an increased portion thereof will eventually pass through the small end of the device (15) or it may be formed of a solid plastic such as polystyrene or polymerized methyl methacrylate (Lucite) which as is known is capable of functioning as a wave guide or "light pipe" for ultraviolet radiation whether or not it is coated on its exterior with suitable ultraviolet reflecting material, but which preferably should be so coated.

In the embodiment shown in Fig. 1 the second or ultraviolet-converting phosphor 16 is positioned adjacent the output end of the device 15 so as to receive over it and from the first phosphor 11 ultraviolet light which it is adapted to convert into light in the visible range of the spectrum. Some of the visible light produced by the phosphor 16 will move from it rightward as the apparatus is represented in the drawing to an input end of a second light conducting device 15' to a photo-electric device 17 which may be connected to conventional indicating and/or recording devices (not shown). Preferably a film or coating 18 capable of passing the ultraviolet radiation and reflecting any visible light is applied to the left face of the second phosphor 16 so that visible light produced by it, by reason of its excitation with ultraviolet radiation will not move uselessly leftward but will be reflected in the general direction of the input end of the light-conducting and photo-electric devices 15' and 17. Suitable materials for such use include potassium films or a filter of 14 g. pure iron-free nickel sulfate crystals and 10 g. pure cobalt sulfate crystals dissolved in 100 cc. distilled water.

The second phosphor 16, which, as noted above, may be much less massive and/or dense than the phosphor 11 without deleteriously affecting the efficiency of the detector, may be formed of a single homogeneous piece of the material selected or of the material in small crystals or in amorphous powdered form held together and mounted on a screen or plate or the like.

Fig. 2 illustrates a modification wherein the visible light produced by the second phosphor 16 is concentrated onto the photo device 17 by a suitable lens or lens system 19 of glass or plastic instead of by the second section 15' of the tapered light conducting device. This arrangement may be preferred where it is desired to foreshorten the apparatus while still retaining two stages of light concentration.

In operation, the first phosphor 11 converts quanta of penetrative radiation into impulses of ultraviolet radiation; the ultraviolet light excites the second phosphor 16 to produce impulses of visible light; and the visible light is converted into electrical pulses by the photo-electric device. In order to permit the detection of individual quanta of the initial radiation, the luminescence afforded by both of the "phosphors" (11 and 16) is of such a character that it does not persist for any appreciable time after the end of the excitation process, i. e., it does not have a slow decay.

If desired, the light-conducting device 15 may be eliminated and the first and second phosphors placed in directly adjacent relationship and in addition, or alternatively, the second light concentrating device can be eliminated by placing the second phosphor immediately adjacent the photo-electric device 17, e. g., immediately adjacent the cathode of a photo-multiplier tube of the end-on type to afford various degrees of foreshortening and compactness.

As will be apparent from the foregoing the arrangement disclosed herein offers high overall efficiency in converting the initial penetrative radiation into electrical impulses by using in succession an increased number of high-efficiency conversions in lieu of using a small number including one or more of lower-efficiency. While there may be some loss of energy in each conversion as well as possible increases in light absorption in some embodiments using elongated conductors, the final energy which is usefully converted into electrical signals will be greater. Thus increased overall efficiency will be afforded by an entire apparatus of the kind shown herein if: (I) the first phosphor (due to (a) its physical composition, (b) its massiveness and/or density, and (c) its good transmission of ultraviolet light) has good efficiency for converting the penetrative radiation into ultraviolet light; (II) the second phosphor (due primarily to its physical composition and its good transmission of visible light) has good efficiency for converting ultraviolet light into visible light; and (III) the photo-electric device has good efficiency for converting visible light variations into electrical signal variations. Moreover additional increases in efficiency will be afforded by concentrating and directing of the light in the manner shown toward the successive stages of conversion and ultimately to the photo-electric device.

Obviously many modifications and variations of the invention as hereinabove set forth may be made without departing from the spirit and scope thereof and therefore only such limitations should be imposed as are indicated in the appended claims.

I claim:

1. Radiation detection apparatus of the kind in which quanta of penetrative radiation are converted into light impulses which in turn are converted into electrical impulses comprising a photo-electric device for converting light impulses into electrical pulses, the photo-electric device being best responsive to light in a pre-determined spectral band, a first phosphor for converting quanta of penetrative radiation into impulses of light, the light being in a spectral band which does not substantially coincide with the first-mentioned spectral band, a second phosphor for converting light impulses produced by the first phosphor into impulses of light in a spectral band near to said first mentioned band, said second phosphor being particularly responsive to light in a spectral band near to that of the light emitted by the first phosphor and a light filter positioned between said first and second phosphors and adapted to pass from the former to the latter light in the spectral band emitted by said first phosphor and to reflect back into the latter light rays in the spectral band originating in the second phosphor which tend to move therein toward the filter.

2. Apparatus as in claim 1 in which said second phosphor element is less massive than the first phosphor element in proportion to the ratio of the respective penetration capabilities of the light which it receives from the first phosphor element and the penetrative radiation which is received on said first element.

3. Radiation detection apparatus comprising a first phosphor element for converting penetrative radiation into light in a pre-determined spectral band, a second phosphor element for converting light from said first element into light in another spectral band, a light filter positioned between said first and second elements and adapted to pass from the former to the latter light in said first spectral band and to reflect back into the latter light rays in said second spectral band which originate in the second element and move therein toward the filter.

4. Apparatus as in claim 3 in which said filter comprises a thin film of potassium.

5. Apparatus as in claim 3 in which said filter comprises a solution of pure-iron free nickel sulfate crystals and pure cobalt sulfate crystals in distilled water.

6. Radiation detection apparatus comprising a first phosphor element for converting penetrative radiation into ultraviolet light, a second phosphor for converting ultraviolet light received from the first phosphor into light which is predominantly of longer wave lengths, said first element having an output surface from which ultraviolet light can escape on its way to the second phosphor, said second phosphor having an input surface on which it can receive ultraviolet light from the first phosphor, said input surface being substantially smaller than said output surface, optical means including a light-pipe type of optical coupling formed of a solid plastic material having good optical transmission characteristics for ultraviolet light emitted by the first phosphor for condensing light received from said output surface to transmit it to said input surface, and a photo-electric device for receiving light from said second phosphor element to convert variations therein into corresponding electrical signal variations.

7. Apparatus as in claim 6 in which said second element has an output surface from which said light of predominantly longer wave lengths can escape on its way to the photo-electric device, said photo-electric device comprises an input surface for receiving said last-mentioned light, said output surface of the second element being substantially larger than said input surface of the photo-electric device, and optical means including a light-pipe type of optical coupling formed of a solid plastic material having good optical transmission characteristics for light emitted by the second phosphor for condensing light from the output surface of the second element to transmit it onto the input surface of the photo-electric device.

References Cited in the file of this patent

UNITED STATES PATENTS

| | | |
|---|---|---|
| 2,452,523 | Leverenz | Oct. 26, 1948 |
| 2,612,610 | Marshall et al. | Sept. 30, 1952 |
| 2,623,181 | Goodrick | Dec. 23, 1952 |